(12) United States Patent
Lin

(10) Patent No.: US 9,979,497 B2
(45) Date of Patent: May 22, 2018

(54) AUDIO PLAYING METHOD AND APPARATUS BASED ON BLUETOOTH CONNECTION

(71) Applicant: Guangdong Oppo Mobile Telecommunications Corp., Ltd., Dongguan, Guangdong (CN)

(72) Inventor: Shangbo Lin, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days. days.

(21) Appl. No.: 15/371,952

(22) Filed: Dec. 7, 2016

(65) Prior Publication Data

US 2017/0093510 A1    Mar. 30, 2017

Related U.S. Application Data

(63) Continuation of application No. PCT/CN2015/096067, filed on Nov. 30, 2015.

(30) Foreign Application Priority Data

Jul. 30, 2015    (CN) .......................... 2015 1 0469491

(51) Int. Cl.
| H04H 20/71 | (2008.01) |
| H04W 4/00 | (2018.01) |
| G06F 3/16 | (2006.01) |

(52) U.S. Cl.
CPC .............. *H04H 20/71* (2013.01); *G06F 3/165* (2013.01); *H04W 4/008* (2013.01); *H04W 4/80* (2018.02)

(58) Field of Classification Search
CPC .............................. H04W 4/008; H04W 76/02
USPC ........................ 455/41.2, 41.3, 67.11, 7, 11.1
See application file for complete search history.

(56) References Cited

U.S. PATENT DOCUMENTS

| 2010/0130131 | A1* | 5/2010 | Ha ...................... H04M 1/7253 455/41.3 |
| 2012/0099594 | A1* | 4/2012 | Lau ...................... H04L 12/2807 370/392 |
| 2014/0006587 | A1 | 1/2014 | Kusano |

FOREIGN PATENT DOCUMENTS

| CN | 104123954 A | 10/2014 |
| CN | 104299632 A | 1/2015 |
| CN | 104506991 A | 4/2015 |
| CN | 104640013 A | 5/2015 |

(Continued)

*Primary Examiner* — John J Lee
(74) *Attorney, Agent, or Firm* — Young Basile Hanlon & MacFarlane, P.C.

(57) ABSTRACT

The present disclosure relates to an audio playing method and apparatus based on Bluetooth connection. The method includes: receiving a first Bluetooth connection request sent from a first audio source device by a first playing device; responding to the first Bluetooth connection request, establishing a first Bluetooth connection with the first audio source device and notifying other playing devices of a target playing group including the first playing device to close Bluetooth function by the first playing device, wherein the target playing group includes at least one playing device communicating via a private network established in advance; and receiving first audio data from the first audio source device based on the first Bluetooth connection and forwarding the first audio data to the other playing devices of the target playing group via the private network by the first playing device.

14 Claims, 10 Drawing Sheets

(56) References Cited

FOREIGN PATENT DOCUMENTS

| CN | 105072564 A | 11/2015 |
|---|---|---|
| WO | 2013049346 A1 | 4/2013 |

* cited by examiner

US 9,979,497 B2

AUDIO PLAYING METHOD AND APPARATUS BASED ON BLUETOOTH CONNECTION

CROSS-REFERENCE TO RELATED APPLICATIONS

This application is a continuation of International Application No. PCT/CN2015/096067, filed on Nov. 30, 2015, which claims the priority to Chinese patent application No. 201510469491.9, filed on Jul. 30, 2015, the disclosures of both of which are herein incorporated by reference in their entireties.

TECHNICAL FIELD

The present disclosure relates to the field of wireless communication technology, particularly to an audio playing method and apparatus based on Bluetooth connection.

BACKGROUND

Wireless Fidelity (referred to as "Wi-Fi") is a technology for connecting personal computers, handheld equipments (such as Pad, mobile phones) and other terminals with each other wirelessly. Communication between terminals such as tablet PCs and mobile phones can be simplified effectively through Wi-Fi technology, and thus provide user with great convenience.

In some scenarios, it is desired that multiple playing devices (such as speakers) should play music simultaneously. For a music system including multiple playing devices, generally, the multiple playing devices of the music system and a control terminal can be connected via Wi-Fi to form a network. After special control software has been installed, the control terminal can control the multiple playing devices to play music simultaneously. However, in some areas, Wi-Fi is un-available, and it is unlikely for the multiple playing devices of the music system to play music simultaneously.

SUMMARY

Disclosed herein are implementations of an audio playing method based on Bluetooth connection, comprising receiving a first Bluetooth connection request sent from a first audio source device by a first playing device, responding to the first Bluetooth connection request by the first playing device, establishing a first Bluetooth connection with the first audio source device, and notifying other playing devices of a target playing group comprising the first playing device to turn off Bluetooth function by the first playing device, wherein the target playing group comprises at least one playing device communicating via a private network established in advance, and receiving first audio data from the first audio source device by the first playing device based on the first Bluetooth connection, and forwarding the first audio data to the other playing devices of the target playing group via the private network by the first playing device, wherein all playing devices of the target playing group are configured to play music corresponding to the first audio data.

Disclosed herein are also implementations of an audio playing method based on Bluetooth connection, comprising determining a first playing device from an audio playing system by an audio source device, wherein the first playing device is configured to play music corresponding to first audio data, and the audio playing system comprises at least one playing group and each playing group comprises at least one playing device communicating via a private network established in advance, sending a Bluetooth connection request to the first playing device to establish a Bluetooth connection with the first playing device by the audio source device, and sending the first audio data to the first playing device based on the Bluetooth connection by the audio source device, wherein the first playing device is configured to forward the first audio data to other playing devices of a target playing group that the first playing device belongs to via the private network, and wherein all playing devices of the target playing group are configured to play music corresponding to the first audio data.

Disclosed herein are also implementations of an audio playing apparatus arranged in a first playing device, comprising one or more processors, a memory configured to store one or more programs, when executed by the one or more processors, the one or more programs are configured to perform: a receiving unit, configured to receive a first Bluetooth connection request sent from a first audio source device, a connection controlling unit, configured to establish a first Bluetooth connection with the first audio source device responding to the first Bluetooth connection request, a notifying unit, configured to notify other playing devices of a target playing group comprising the first playing device to turn off Bluetooth function, wherein the target playing group comprises at least one playing device communicating via a private network established in advance, and a transceiver unit, configured to receive first audio data from the first audio source device based on the first Bluetooth connection and forward the first audio data to the other playing devices of the target playing group via the private network, wherein all playing devices of the target playing group are configured to play music corresponding to the first audio data.

BRIEF DESCRIPTION OF THE DRAWINGS

In order to illustrate the technical solutions of the present disclosure more clearly, a brief description of the accompanying drawings used herein is given below. Obviously, the drawings listed below are only examples and a person skilled in the art should be noted that, other drawings can also be obtained on the basis of these exemplary drawings without creative activity

DETAILED DESCRIPTION

Technical schemes of the present disclosure will be described clearly and completely in conjunction with accompanying drawings. The implementations illustrated below are merely part rather than all of the present disclosure. Any other implementation obtained by one skilled in the art based on the implementations described herein without creativity work should fall into the protective scope of the present disclosure.

It should be noted that, audio source devices referred to in the description of the present disclosure may include but not limited to smart phones (Such as Android phones, iOS mobile phones and so on), tablets, Personal Computer (referred to as "PC"), Mobile Internet Device (referred to as "MID"), Personal Digital Assistant (referred to as "PDA") and other terminals. Playback devices involved herein can be any audio data player, such as speakers, mobile phones, and other terminals.

Figure 1:
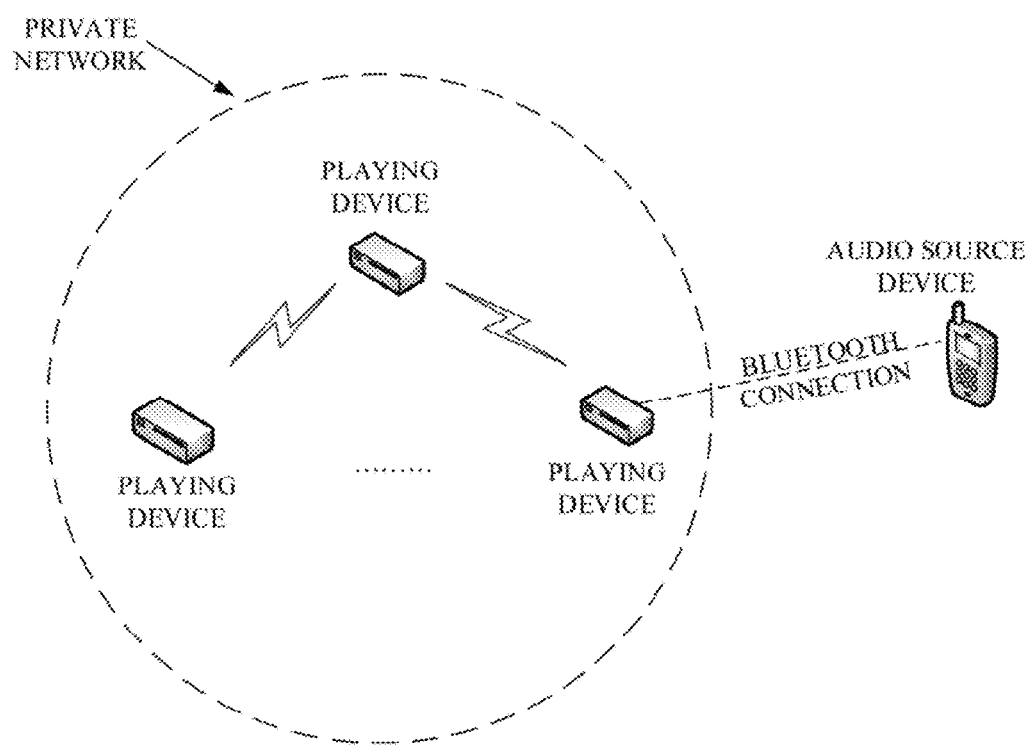
FIG. 1 is a schematic architecture diagram illustrating an audio playing system according to an implementation of the present disclosure.

FIG. 1 is a schematic architecture diagram illustrating an audio playing system according to an implementation of the present disclosure. As shown in FIG. 1, the audio playing system includes an audio source device and at least one playing devices (only three playing devices are illustrated in FIG. 1). The at least one playing device establish a private network via Mesh network (wireless grid network) to form a playing group. The audio source device can establish Bluetooth connection with any playing device of the playing group such that multiple playing devices of the playing group can play audio synchronously based on the Bluetooth connection established.

Implementation 1

Figure 2:
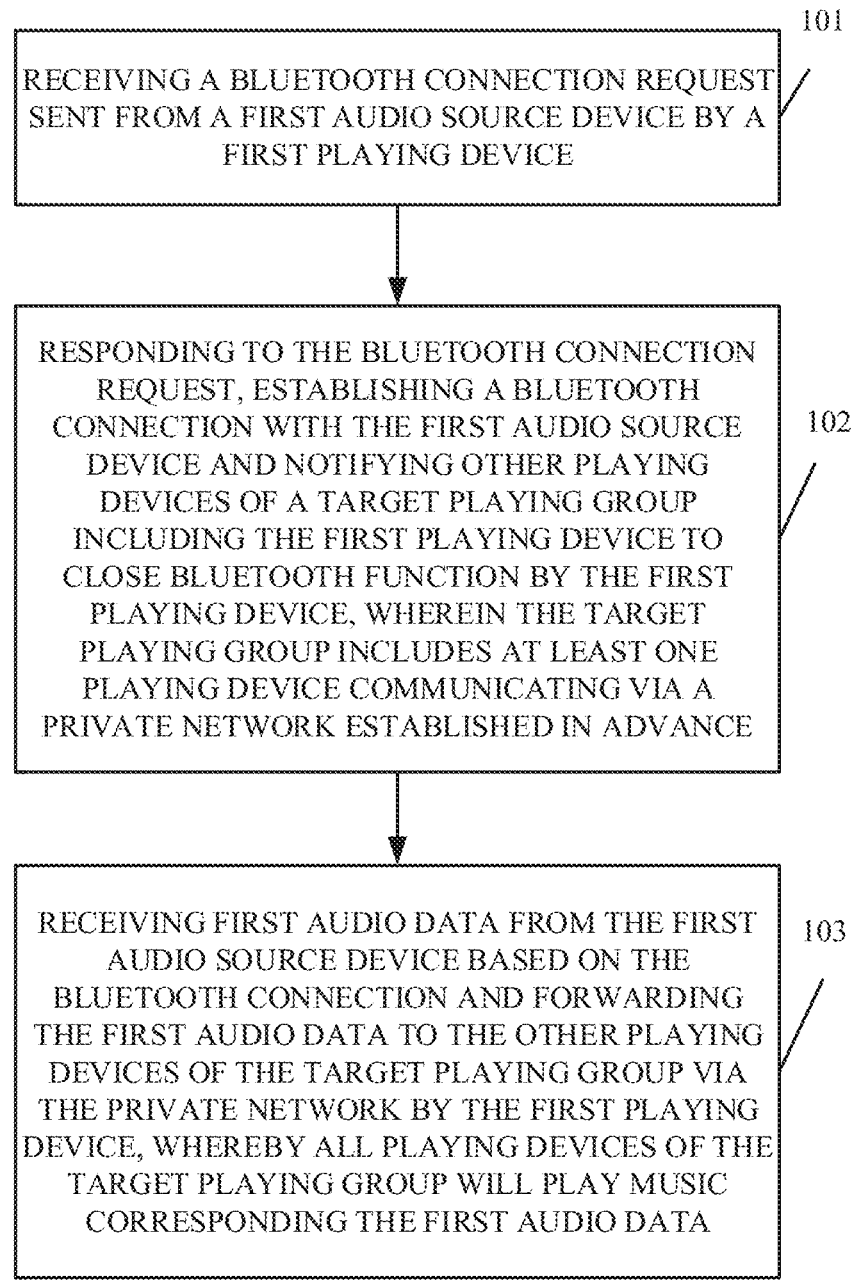
FIG. 2 is a schematic flow chart illustrating an audio playing method based on Bluetooth connection according to an implementation of the present disclosure.

FIG. 2 is a schematic flow chart illustrating an audio playing method based on Bluetooth connection according to an implementation of the present disclosure. As shown in FIG. 2, this method can begin at block 101, and can be executed by a first playing device.

At block 101, the first playing device receives a Bluetooth connection request (can be referred to as "first Bluetooth connection request") from a first audio source device.

At block 102, responding to the Bluetooth connection request, the first playing device establishes a Bluetooth connection (can be referred to as "first Bluetooth connection") with the first audio source device and notify other playing devices of a target playing group including the first playing device to close Bluetooth function, wherein the target playing group includes at least one playing device communicating via a pre-established private network.

The first playing device can be any playing device of the target playing group. The other playing devices of the target playing group that the first playing device belongs to can include all playing devices except the first playing device of the target playing group.

As one implementation, if no audio source device is connected with any playing device of a playing group, all playing devices of the playing group can turn on Bluetooth such that it is possible for the audio source device to search for all playing devices of the playing group and can establish a Bluetooth connection with any searched playing device.

Furthermore, after establishing the Bluetooth connection with the first audio source device, the first playing device can notify other playing devices of the target playing group to turn off Bluetooth via the pre-established private network, whereby Bluetooth connection interference caused by the other playing devices can be avoided, power consumption and wireless interference can be reduced either.

As to the private network referred to herein, it can be a local area network (LAN). A private address, which is an IP address used in LAN, can be assigned to each playing device of a playing group respectively, whereby multiple playing devices of the playing group can access to the same LAN (that is, the same private network) and communicate through the accessed LAN. As an implementation, the private network can be established prior to Wi-Fi can be detected, and as a result, each playing device of the playing group can communicate via the private network without Wi-Fi.

As another implementation, before the first playing device notifies the other playing devices of the target playing group to turn off Bluetooth function, an authentication of an audio source device (i.e., the first audio source device) that initiated the Bluetooth connection request can be conducted, through which validity of the identity of the first source device is verified, and the notification of turning off Bluetooth function will be conducted based on a valid verification. For example, the first playing device can acquire identity information of the first audio source device and compare it with preset identity information of a legitimate audio source device, the first audio source device is legitimate if there is a match, and the first playing device can notify the other playing devices of the target playing group to turn off Bluetooth function. The authentication can still be performed after the Bluetooth connection request from the first audio source device is received by the first playing device but before the Bluetooth connection with the first audio source device is established responding to the Bluetooth connection request. Similarly, the Bluetooth connection with the first audio source device will be established responding to the Bluetooth connection request only when the first audio source device is verified to be legitimate. The identity information can be a device identification or other identity information of an audio source device; for example, for an audio source device such as a mobile phone, the identity information can be International Mobile Subscriber Identification Number (referred to as "IMSI"), Integrate Circuit Card Identity ("ICCID"), and so on. The first playing device or a cloud server can have a device identification of a legitimate audio source device pre-stored therein, the identity of the first audio source device will be deemed as legitimate if there is a match between the device identification acquired and the pre-stored device identification.

At block 103, the first playing device receives first audio data from the first audio source device based on the Bluetooth connection and forwards the first audio data to the other playing devices of the target playing group via the private network, whereby all playing devices of the target playing group will play music corresponding to the first audio data.

After establishing a Bluetooth connection with one playing device (that is, the first playing device mentioned above) among multiple searched playing devices, the first playing device can send a network message to other playing devices except the first playing device of the target playing group via a private network corresponding to the target playing group. The network message can be a connection establishing message and is configured to notify the other playing devices to turn off Bluetooth function and wait for reception of audio data forwarded by the first playing device. As to the first playing device, it can forward the audio data transmitted from the first audio source device via Bluetooth to the other playing devices of the target playing group that it belong to, such that all playing devices of the same playing group can play the same audio synchronously.

EXAMPLE 1

As one implementation, after the process performed at block 103, the first playing device may receive another Bluetooth connection request from another audio source device which is different from the first audio source device, in this case, the method can further include the following processes.

The first playing device can disconnect the Bluetooth connection with the first audio source device upon reception of a Bluetooth connection request (can be referred to as "second Bluetooth connection request") from a second audio source device and notify the other playing devices of the target playing group to stop working via the private network.

The first playing device can receive second audio data from the second audio source device and forward the second audio data to the other playing devices of the target playing group via the private network, whereby all playing devices of the target playing group will play music corresponding to the second audio data.

EXAMPLE 2

As another implementation, after establishing the Bluetooth connection with the first audio source device responding to the Bluetooth connection request, the first playing device can set a working state of its own to an un-connectable state, under which state the first playing device is prohibited from response to a Bluetooth connection request from an audio source device.

As can be seen, for the first playing device that has established the Bluetooth connection with the first audio source device, it can allow a new audio source device (for example, the second audio source device) to establish a Bluetooth connection therewith; in this case, the first playing device can disconnect the Bluetooth connection with the first audio source device and notify the other playing devices except the first playing device of the target playing group to stop working, such as stop playing music or stop forwarding audio data and so on. Upon reception of audio data (such as the second audio data) from the new audio source device, the first playing device can forward the same to the other playing devices, whereby all playing devices of a playing group can play the audio data sent from the new audio source device synchronously. In contrast, for the first playing device that has established the Bluetooth connection with the first audio source device, Bluetooth connection with a new audio source device can be rejected, or, it can be set to a state in which the first playing device will not be found by other audio devices.

EXAMPLE 3

Furthermore, there is a possibility that the Bluetooth connection between the first playing device and the first audio source device may be disconnected for some reason, for example, the first audio source device or the first playing device moves out of a Bluetooth connection range, or playing of the music corresponding to the audio data transmitted by the first audio source device has completed, or Bluetooth function of the first audio source device has been turned off, and so on. In such conditions, the first playing device can notify, via the private network set in advance, the other playing devices of the target playing group to restart Bluetooth function, that is to say, to set Bluetooth function to a connectable state, whereby an audio source device can search all playing devices of the target playing group and establish a Bluetooth connection with any searched playing device.

In this case, the method can further include the following processes.

The first playing device notifies all playing devices of the target playing group via the private network to restart Bluetooth function upon disconnection of the Bluetooth connection with the first audio source device, whereby from the target playing group, a third audio source device can choose a second playing device that is required to establish a Bluetooth connection.

The first playing device turns off Bluetooth function upon reception of a Bluetooth close message from the second playing device.

The first playing device receives third audio data sent from the third audio source device and forwarded by the second playing device, and plays music corresponding to the third audio data.

Implementation 2

Figure 3:
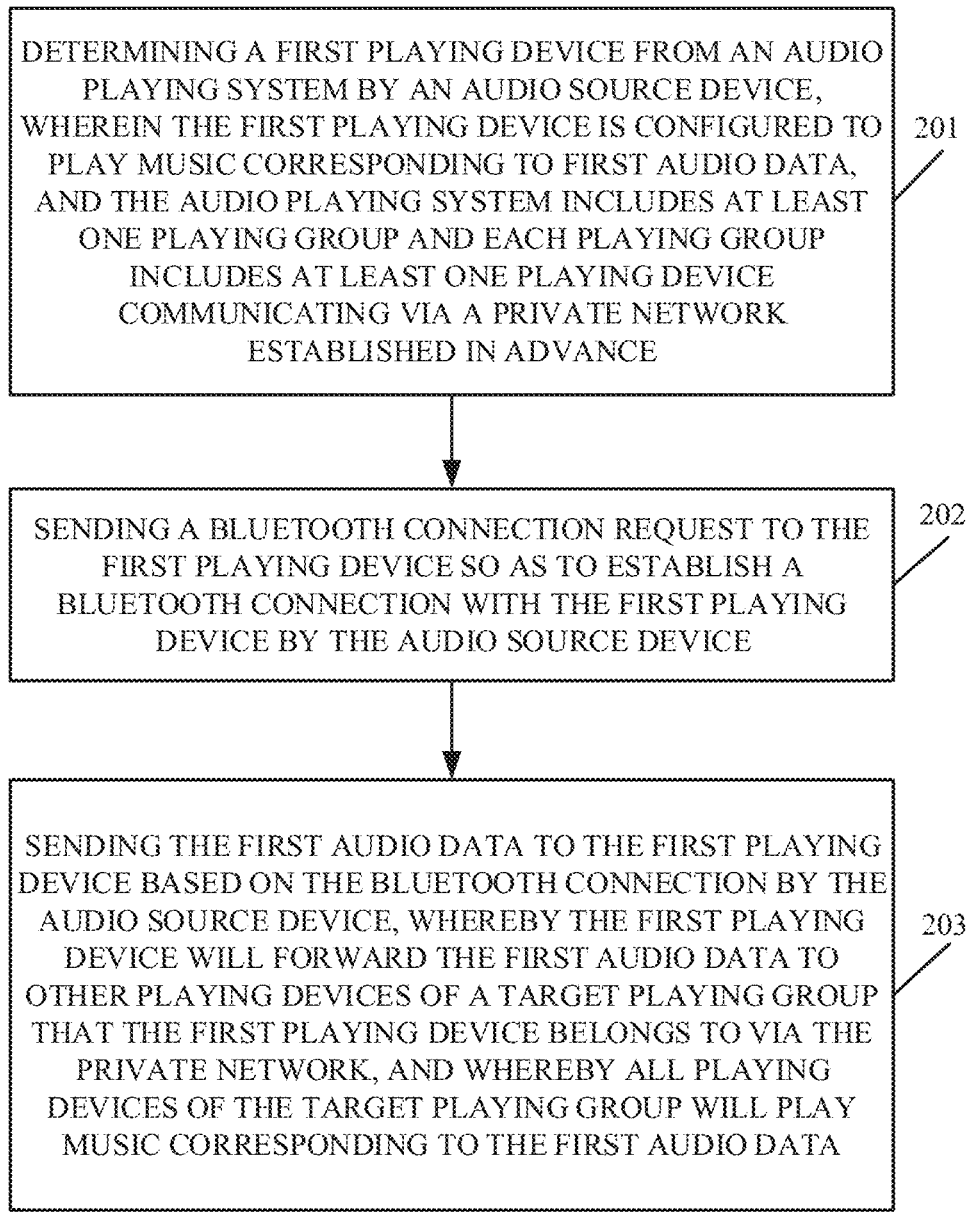
FIG. 3 is a schematic flow chart illustrating another audio playing method based on Bluetooth connection according to an implementation of the present disclosure.

FIG. 3 is a schematic flow chart illustrating another audio playing method based on Bluetooth connection according to an implementation of the present disclosure. As shown in FIG. 3, the method can begin at block 201.

At block 201, an audio source device determines a first playing device from an audio playing system, wherein the first playing device is configured to play music corresponding to first audio data, and the audio playing system includes at least one playing group and each playing group includes at least one playing device communicating via a private network established in advance.

At block 202, the audio source device sends a Bluetooth connection request to the first playing device so as to establish a Bluetooth connection with the first playing device.

At block 203, the audio source device sends the first audio data to the first playing device based on the Bluetooth connection, whereby the first playing device will forward the first audio data to other playing devices of a target playing group that the first playing device belongs to via the private network, and whereby all playing devices of the target playing group will play music corresponding to the first audio data.

When implemented, an audio playing system including multiple playing devices can be established in advance, the entire audio playing system can be deemed as a playing group and operate as a whole, that is to say, all playing devices of the audio playing system can play the same audio synchronously. Furthermore, multiple playing devices of the audio playing system can be divided into multiple playing groups according to actual needs such that each playing group can play different audio separately. For example, there are four playing devices, that is, Playback Devices A, B, C, and D in an audio playing system, among which Playback Devices A and B constitute Playback Group 1 and Playback Devices C and D constitute Playback Group 2. Playback Devices A and B of Playback Group 1 can play the same audio synchronously and Playback Devices C and D of Playback Group 2 can play the same audio synchronously either. Playback Group 1 and Playback Group 2 are independent from each other and can play the same or different audio. In addition, these two playing groups can be controlled by the same or different audio source device.

Furthermore, an audio source device such as a mobile phone can manage preset playing groups, for example, the management of the audio source device can be achieved through some playing device control application installed. For instance, the audio source device can receive a playing group management instruction triggered through a user operation; responding to the playing group management instruction, the audio source device can manage a playing group(s) corresponding to the instruction of the music or audio playing system. The management referred to above includes one or more of changing playing group name, adding playing devices to playing groups, deleting playing devices from playing groups, and deleting playing groups.

As one implementation, before managing playing groups corresponding to the playing group instruction of the audio playing system responding to this instruction, the audio source device can output prompt information configured to prompt for inputting information to be verified; information to be verified is inputted responding to the prompt information and is received by the audio source device; the audio source device determines whether the information to be verified matches preset verification information, and if yes, the audio source device proceeds to the process of managing playing groups corresponding to the playing group management instruction of the audio playing system responding to this instruction.

When implemented, after receiving a playing group management instruction triggered by a user operation such as double clicking or clicking a preset button, an audio source device such as a mobile phone can output prompt information configured to prompt for inputting information to be verified, and the audio source device can display/output an input port used to input the information to be verified. Among which the information to be verified includes but not limited to one or more or a combination of a password to be verified, fingerprint information to be verified, facial information to be verified, Iris information to be verified, retinal information to be verified, and voiceprint information to be verified. Similarly, the preset verification information can be set in advance and can include but not limited to one or more or a combination of a preset password, preset fingerprint information, preset facial information, preset Iris information, preset retinal information, and present voiceprint information.

As an example, the preset verification information can includes fingerprint string information and corresponding input time of each fingerprint; correspondingly, the process of determining whether the information to be verified matches the preset verification information can be achieved as follows: verifying whether the fingerprint string information is identical with a fingerprint string included in the preset verification information and whether a difference between input time of two identical fingerprints is smaller than a preset value; if the fingerprint string information is identical with the fingerprint string included in the preset verification information and the difference between input time of two identical fingerprints is smaller than a preset value, it indicates that the information to be verified matches the preset verification information; otherwise, it indicates that the information to be verified does not match the preset verification information. With aid of the above mentioned verification, operations of illegal users on an audio source device such as a mobile phone can be avoided.

In the implementations described above, an audio source device can establish a Bluetooth connection with any playing device of a playing group. Based on the Bluetooth connection established, upon reception of audio data sent from the audio source device, the playing device connected can forward the audio data to other playing devices of the playing group via a preset private network, whereby all playing devices of the playing group can play music corresponding to the audio data synchronously. Even in areas without Wi-Fi, synchronous playing of the music by multiple playing devices can be achieved. Furthermore, after the Bluetooth connection between the playing device of the playing group and the audio source device, by turning off Bluetooth function of other playing devices of this playing group automatically, Bluetooth connection interference caused by other audio source devices can be avoided and power consumption of the playing device can be reduced.

Implementation 3

Figure 4A:
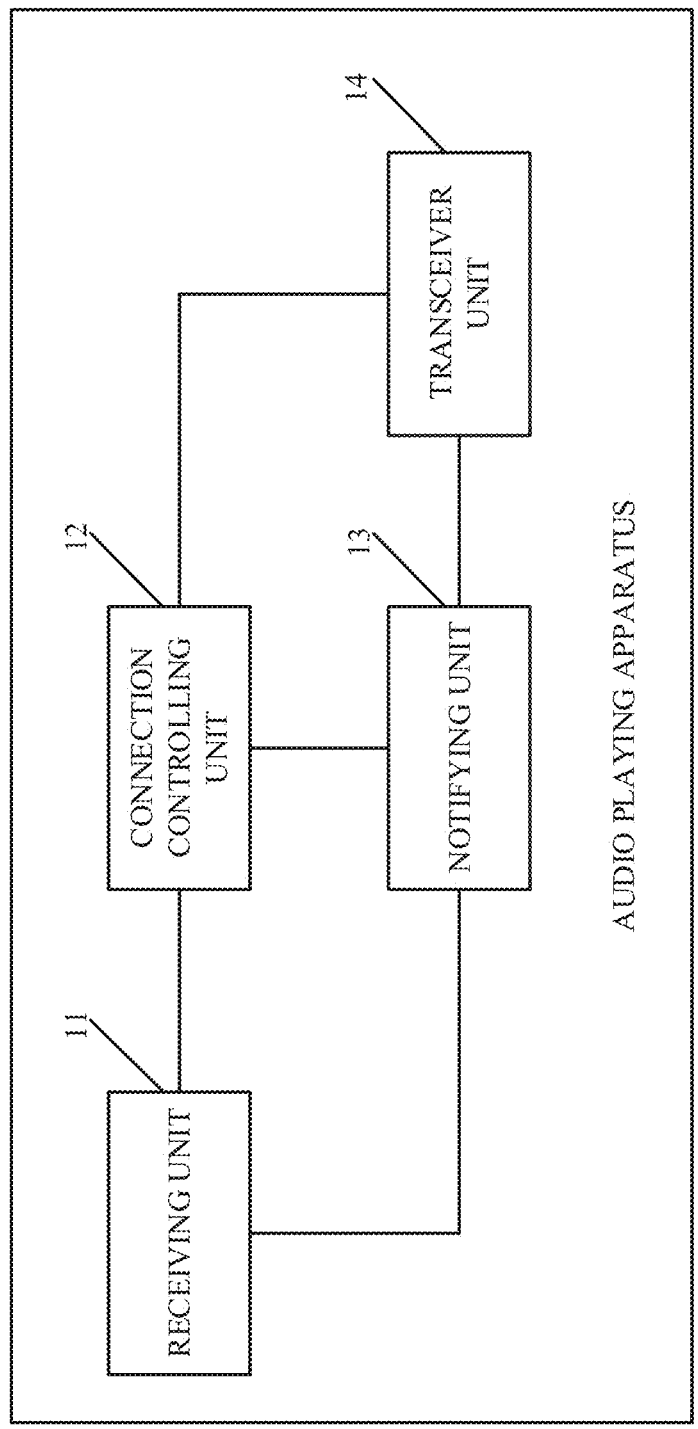
FIG. 4A-4B are a schematic structure diagrams illustrating an audio playing apparatus according to an implementation of the present disclosure.

FIG. 4A is a schematic structure diagram illustrating an audio playing apparatus according to an implementation of the present disclosure. As shown in FIG. 4A, this apparatus can include a receiving unit 11, a connection controlling unit 12, a notifying unit 13, and a transceiver unit 14.

The receiving unit 11 can be a receiver and is configured to receive a Bluetooth connection request from a first audio source device.

The connection controlling unit 12 can be a controller and is configured to establish a Bluetooth connection with the first audio source device responding to the Bluetooth connection request.

The notifying unit 13 can be a processor integrated with communication function and is configured to notify other playing devices of a target playing group including the first playing device to close Bluetooth function, wherein the target playing group includes at least one playing device communicating via a private network established in advance.

The first playing device can be any playing device of the target playing group. The other playing devices of the target playing group that the first playing device belongs to can include all playing devices except the first playing device of the target playing group.

When implemented, after the Bluetooth connection between the first playing device and the first audio source device has been established by the connection controlling unit 12, the notifying unit 13 can notify other playing devices of the target playing group to turn off Bluetooth via the pre-established private network, whereby Bluetooth connection interference caused by the other playing devices can be avoided, power consumption and wireless interference can be reduced either.

The transceiver unit 14 can be a transceiver or an integration of a transmitter and receiver, and is configured to receive first audio data from the first audio source device based on the Bluetooth connection and forward the first audio data to the other playing devices of the target playing group via the private network, whereby all playing devices of the target playing group will play music corresponding to the first audio data.

After the Bluetooth connection request from the first audio source device has been received by the receiving unit 11 and the Bluetooth connection with the first audio source device has been established by the connection controlling unit 12, the notifying unit 13 can send a connection establishing message to other playing devices except the first playing device of the target playing group via a private network corresponding to the target playing group. The connection establishing message is configured to notify the other playing devices to turn off Bluetooth function, stop working, such as stop playing music or stop forwarding audio data, and wait for reception of audio data forwarded by the first playing device. Upon reception of the audio data from the first audio source device transmitted through Bluetooth, the transceiver unit 14 can forward the audio data to the other playing devices of the target playing group that it belong to, such that all playing devices of the same playing group can play the same audio synchronously.

As one implementation, the receiving unit 11 is further configured to receive a Bluetooth connection request from a second audio source device, the connection controlling unit 12 is further configured to disconnect the Bluetooth connection with the first audio source device upon reception of the Bluetooth connection request from the second audio source device by the receiving unit 11, and the notifying unit 13 is further configured to notify the other playing devices of the target playing group to stop working via the private network; the transceiver unit 14 is further configured to receive second audio data from the second audio source device and forward the second audio data to the other playing devices of the target playing group via the private network, whereby all playing devices of the target playing group will play music corresponding to the second audio data.

As another implementation, the notifying unit 13 is further configured to notify all playing devices of the target playing group via the private network to restart Bluetooth function upon disconnection of the Bluetooth connection with the first audio source device, whereby a third audio source device can choose, from the target playing group, a second playing device which is required to establish a Bluetooth connection. The receiving unit 11 is further configured to receive a Bluetooth close message sent form the second playing device, and as shown in FIG. 4B, the audio playing apparatus can further include a Bluetooth controlling unit 18 configured to turn off Bluetooth function upon reception of the Bluetooth close message sent form the second playing device by the receiving unit 11; the transceiver unit 14 is further configured to receive third audio data sent from the third audio source device and forwarded by the second playing device and play music corresponding to the third audio data.

Figure 4B:
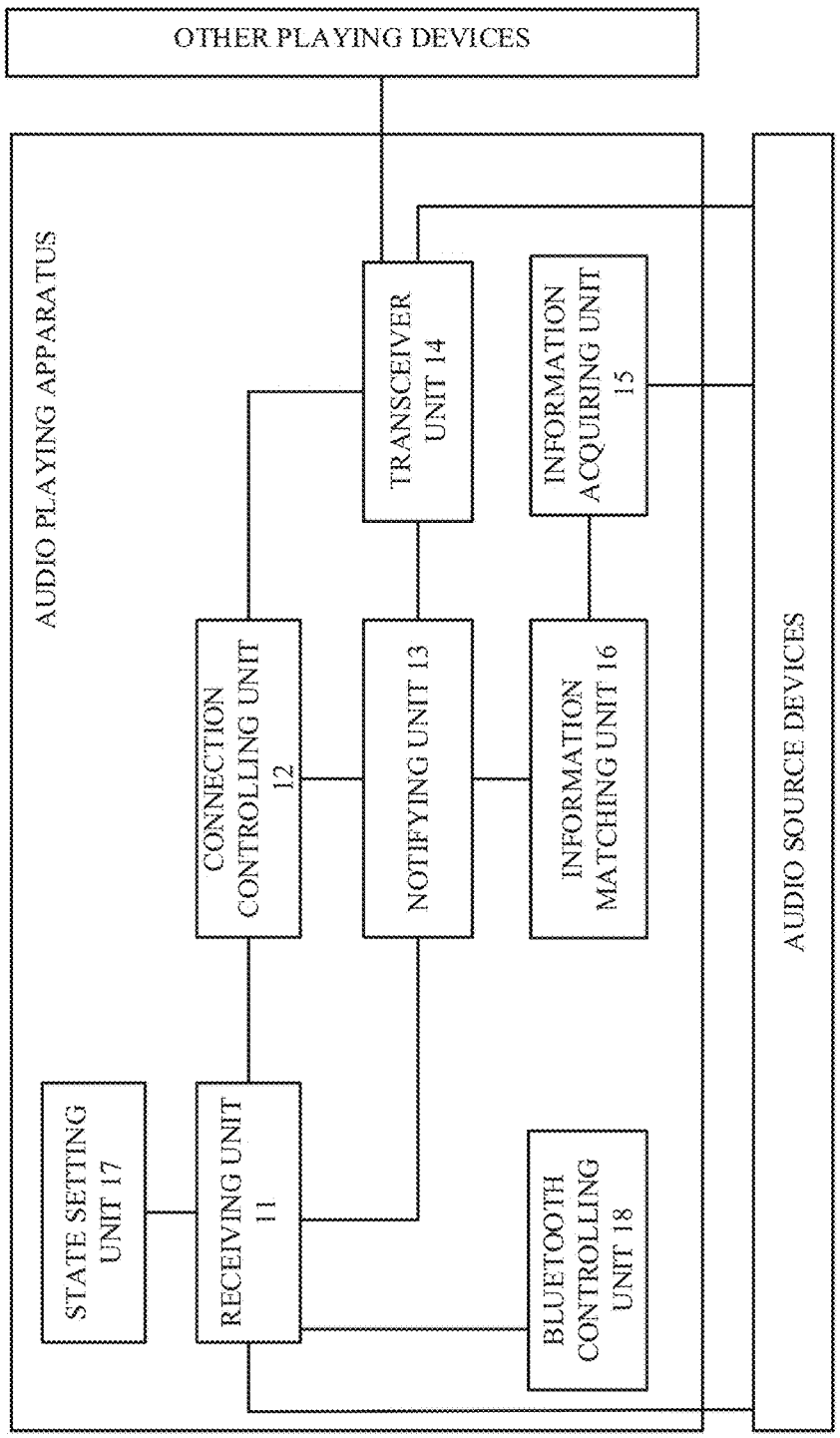

According to a further implementation of the present disclosure, the audio playing apparatus can further include the following elements as illustrated in FIG. 4B.

An information acquiring unit 15, can be an explorer and is configured to acquire identity information of the first audio source device; and an information matching unit 16, which can be a comparator and is configured to determine whether the identity information acquired by the information acquiring unit 15 matches preset identity information of a legitimate audio source device, and if there is a match, trigger the notifying unit 13 to notify the other playing devices of the target playing group including the first playing device to turn off Bluetooth function.

According to a further implementation of the present disclosure, the audio playing apparatus can further include the following elements illustrated in FIG. 4B.

A state setting unit 17, which can be a setter, is configured to set a working state of the audio playing apparatus to an un-connectable state, wherein under the un-connectable state, the audio playing apparatus (or the first playing device) is prohibited from response to a Bluetooth connection request from an audio source device.

As can be seen, for the first playing device that has established the Bluetooth connection with the first audio source device, it still can allow a new audio source device (for example, the second audio source device) to establish a Bluetooth connection therewith; in this case, the connection controlling unit 12 can disconnect the Bluetooth connection with the first audio source device and trigger the notifying unit 13 to notify the other playing devices except the first playing device of the target playing group to stop working, such as stop playing music or stop forwarding audio data and so on. Upon reception of audio data (such as the second audio data) from the new audio source device, the transceiver unit 14 can forward the same to the other playing devices, whereby all playing devices of a playing group can play the audio data sent from the new audio source device synchronously. In contrast, for the first playing device that has established the Bluetooth connection with the first audio source device, Bluetooth connection with a new audio source device can be rejected by setting the working state thereof to the un-connectable state by the state setting unit 17, or, it can be set to a state by the state setting unit 17 in which the first playing device will not be found by other audio devices.

Implementation 4

Figure 5A:
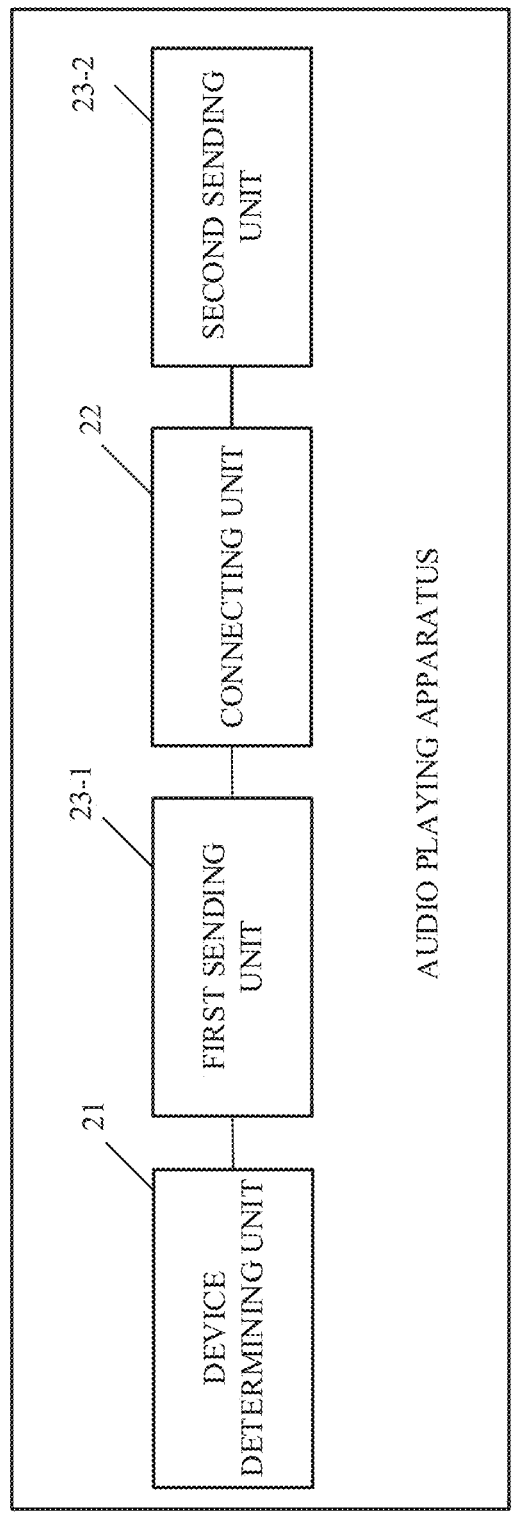
FIG. 5A-5B are schematic structure diagrams illustrating another audio playing apparatus according to an implementation of the present disclosure.

FIG. 5 is a schematic structure diagram illustrating another audio playing apparatus according to an implementation of the present disclosure. As shown in FIG. 5, this apparatus can be arranged in an audio source device and includes a device determining unit 21, a connecting unit 22, a first sending unit 23-1, and a second sending unit 23-2, which will be described in detail in the following.

The device determining unit 21 can be a processor and is configured to determine a first playing device from an audio playing system, wherein the first playing device is configured to play music corresponding to first audio data, and the audio playing system includes at least one playing group and each playing group includes at least one playing device communicating via a private network established in advance.

The first sending unit 23-1 (such as a transmitter) is configured to send a Bluetooth connection request to the first playing device.

The connecting unit 22 (such as a controller or connector) is configured to establish a Bluetooth connection with the first playing device.

The second sending unit 23-2 (such as a transmitter) is configured to send the first audio data to the first playing device based on the Bluetooth connection established by the connecting unit 22, whereby the first playing device will forward the first audio data to other playing devices of a target playing group that the first playing device belongs to via the private network, and whereby all playing devices of the target playing group will play music corresponding to the first audio data.

The first sending unit 23-1 and second sending unit 23-2 can be integrated into one hardware element equipped with transmission function, or can be implemented separately as described above, the present disclosure is not limited thereto.

When implemented, an audio playing system can be composed of multiple playing devices, the entire audio playing system can be deemed as a playing group and operate as a whole, that is to say, all playing devices of the audio playing system can play the same audio synchronously. Furthermore, multiple playing devices of the audio playing system can be divided into multiple playing groups according to actual needs such that each playing group can play different audio separately. For example, the device determining unit 21 can determine a target playing group that is required to play music corresponding to audio data such as the first audio data and choose one playing device (i.e., the first playing device) required to establish a Bluetooth connection from the target playing group, whereby after the Bluetooth connection with the first playing device is established through the connecting unit 22, the second sending unit 23-2 can send first audio data to the first playing device. Then the first playing device can forward the first audio data to other playing devices of the target playing group via a pre-set private network such that all playing devices of the target playing group can play music corresponding to the first audio data synchronously.

Figure 5B:
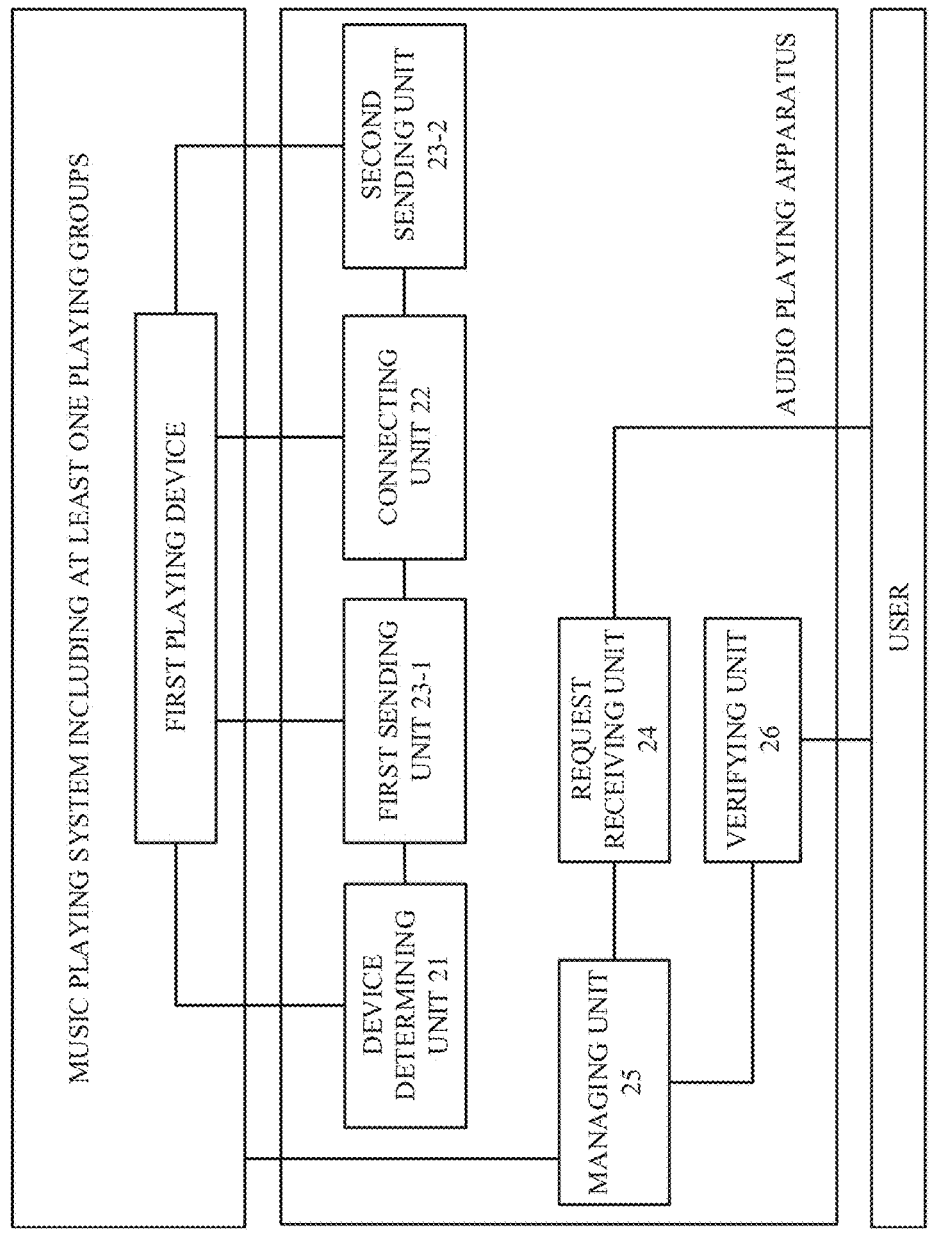

As one implementation, the audio playing apparatus can further include the following elements illustrated in the FIG. 5B.

A request receiving unit 24 (such as a receiver), configured to receive a playing group management instruction triggered through a user operation.

A managing unit 25 (such as a controller), configured to manage playing groups corresponding to the playing group management instruction of the audio (music) playing system responding to the playing group management instruction, wherein management of the managing unit 25 includes one or more of changing playing group name, adding playing devices to playing groups, deleting playing devices from playing groups, and deleting playing groups.

As a further implementation, as shown in FIG. 8B, the audio playing apparatus can further include a verifying unit 26 (such as an authenticator), which is configured to, before managing the playing groups corresponding to the playing group management instruction of the audio playing system responding to the instruction, verify the validity of the current user identity; for verification manners, please refer to relevant description in the above implementations and it will not be repeated here. With aid of the technical schemes described here, operations of illegal users on an audio source device such as a mobile phone can be avoided.

In the implementations described above, an audio source device can establish a Bluetooth connection with any playing device of a playing group. Based on the Bluetooth connection established, upon reception of audio data sent from the audio source device, the playing device connected can forward the audio data to other playing devices of the playing group via a preset private network, whereby all playing devices of the playing group can play music corresponding to the audio data synchronously. Even in areas without Wi-Fi, synchronous playing of the music by multiple playing devices can be achieved. Furthermore, after the Bluetooth connection between the playing device of the playing group and the audio source device, by turning off Bluetooth function of other playing devices of this playing group automatically, Bluetooth connection interference caused by other audio source devices can be avoided and power consumption of the playing device can be reduced.

Implementation 7

Figure 6:
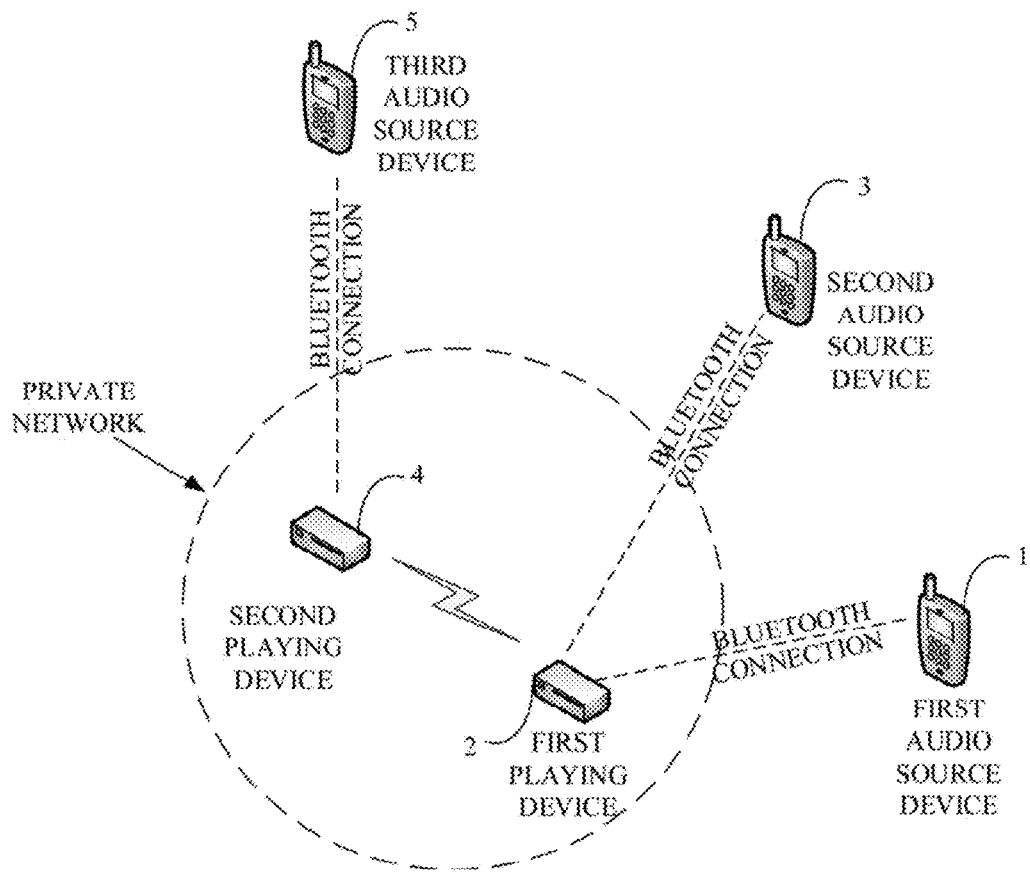
FIG. 6 is a schematic structure diagram illustrating an audio playing system according to an implementation of the present disclosure.

FIG. 6 is a schematic structure diagram illustrating an audio playing system according to an implementation of the present disclosure. As shown in FIG. 6, the audio playing system can include a first playing device 2 and a first audio source device 1.

The first audio source device 1 is configured to determine a playing device used to play music corresponding to first audio data from an audio playing system and send a Bluetooth connection request to the determined playing device, that is, the first playing device 2; wherein the audio playing system includes at least one playing group and each playing group includes at least one playing device communicating through a preset private network.

The first playing device 2 is configured to receive the Bluetooth connection request from the first audio source device 1, establish a Bluetooth connection with the first audio source device 1 responding to the Bluetooth connection request, and notify other playing devices of a target playing group including the first playing device to turn off Bluetooth function.

The first audio source device 1 is further configured to sent the first audio data to the first playing device 2 based on the Bluetooth connection; the first playing device 2 is further configured to receive the first audio data based on the Bluetooth connection and forward the first audio data to other playing devices of the private network, whereby all playing devices of the target playing group can play music corresponding to the first audio data.

As one implementation, the audio playing system further includes a second audio source device 3.

As an example, the second audio source device 3 is configured to send a Bluetooth connection request to the first playing device 2; the first playing device 2 is further configured to disconnect the Bluetooth connection with the first audio source device upon reception of the Bluetooth connection request from the second audio source device 3 and notify the other playing devices of the target playing group to stop working via the private network.

As another example, the second audio source device 3 is further configured to send second audio data to the first playing device 2; the first playing device 2 is further configured to receive the second audio data and forward the second audio data to the other playing devices of the target playing group via the private network, whereby all playing devices of the target playing group can play music corresponding to the second audio data.

As another implementation, the audio playing system can further include a second playing device 4 and a third playing device 5.

The third audio source device 5 is configured to send a Bluetooth connection request to the second playing device 4 upon disconnection of the Bluetooth connection between the first playing device 2 and the first audio source device 1.

The second playing device 4 is configured to receive the Bluetooth connection request from the third audio source device 5 and send a connection establishing message to other playing devices except the second playing device 4 of the target playing group via the private network so as to notify the other playing devices to stop working and turn off Bluetooth function.

The first playing device 2 is further configured to stop working and turn off Bluetooth function upon reception of the connection establishing message sent from the second playing device 4.

The third audio source device 5 is further configured to send third audio data to the second playing device 4; the second playing device 4 is further configured to receive the third audio data and forward the same to other playing devices except the second playing device 4 of the target playing group via the private network, whereby all playing devices of the target playing group can play music corresponding to the third audio data.

The first playing device 2 is further configured to receive the third audio data and play the music corresponding to the third audio data.

For example, a playing group is composed of 5 playing devices, that is, Playback Device A, B, C, D, and E, Audio Source Device 1 (the first audio source device) can establish a Bluetooth connection with any of the playing devices. Suppose Audio Source Device 1 establishes a Bluetooth connection with Playback Device A (the first playing device) and then Playback Device A will notify Playback Device B, C, D, and E of this playing group to turn off Bluetooth connection. Playback device 1 sends audio data to Playback Device A, and Playback Device A will send the audio data received to other playing devices, that is, Playback devices B, C, D, and E of this playing group via a private network corresponding to the playing group, whereby all the five playing devices of the playing group can play an audio transmitted from Audio Source Device 1 synchronously.

Furthermore, suppose Audio Source Device 2 (the second audio source device) wants to couple to Playback Device A, in this case, Playback Device A will disconnect the Bluetooth connection with Audio Source Device 1 and establish a Bluetooth connection with Audio Source Device 2. Playback Device A will send a network message such as a connection establishing message to each playing device of the playing group to notify the each playing device to stop working (such as stop playing music corresponding to the current audio data) and wait for audio data sent from a new audio device. Playback Device A can forward the audio data sent from Audio Source Device 2 via Bluetooth to other playing devices of the playing group, whereby all playing devices of the playing group can play music corresponding to the audio data sent from Audio Source Device 2 synchronously.

Suppose Audio Source Device 3 (the third audio source device) wants to establish a Bluetooth connection with Playback Device B (the second playing device) of the playing group after the Bluetooth connection between Playback Device A and Audio Source Device 2 is disconnected. Playback Device B can send a connection establishing message to each playing device of the playing group to notify the access of Audio Source Device 3, and notify Playback Devices A, C, D, and E of the playing group to turn off Bluetooth function, stop working, and wait to receive and play new audio data. After receiving the connection establishing message, Playback Device A will turn off Bluetooth function and stop working. Similar to this, after receiving the connection establishing message, all playing devices of this playing group will wait to play the audio data (third audio data) of Audio Source Device 3 forwarded by Playback Device B. As to Playback Device B, after receiving the audio data transmitted from Audio Source Device 3 via Bluetooth, it can forward the audio data to other playing devices of the playing group such that all playing devices of the playing group can play the audio data transmitted from Audio Source Device 3 synchronously.

Implementation 8

Figure 7:
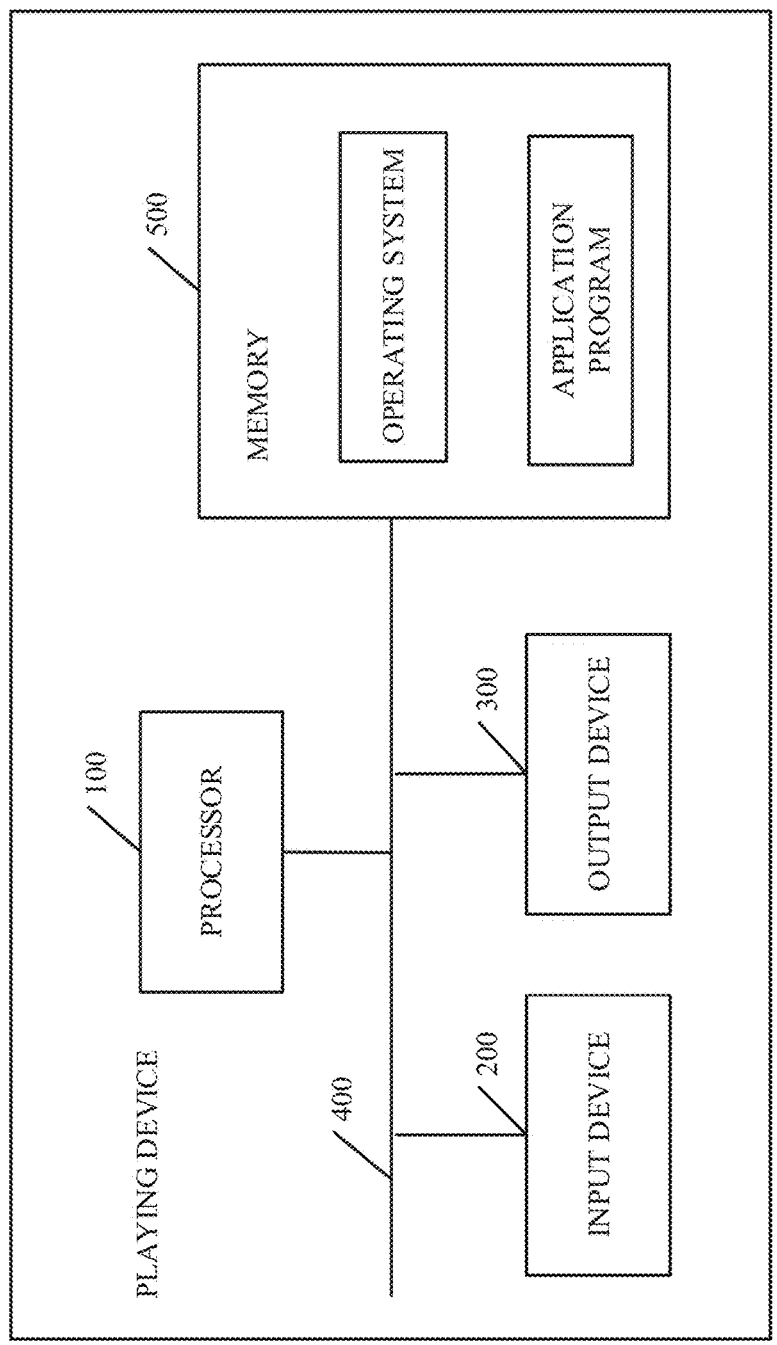
FIG. 7 is a schematic structure diagram illustrating a playing device according to an implementation of the present disclosure.

FIG. 7 is a schematic structure diagram illustrating a playing device according to an implementation of the present disclosure. The playing device shown in FIG. 7 can be the first playing device described above and can include at least one processor 100, at least one input device 200, at least one output device 300, a Memory 500 and so on. These components communicate with each other via one or more Buses 400. The structure illustrated in FIG. 7 should not be comprehend as any limitation to the implementation of the present disclosure, it can be a bus topology structure or a star topology structure; in addition, the structure can include more or less components than those illustrated or use a combination of some of the components or even adopt a different component layout.

The processor 100 is the control center of the playing device, it use various interfaces and circuits to connect each part of the whole playing device, and can perform various functions and process data of the playing device through performing or running programs and/or units stored in the Memory 500 and invoking data stored in the Memory 500. The processor 100 can be composed of an Integrated Circuit (IC), for example, it can be composed by a single packaged IC or by connecting multiple packaged ICs with the same or different function. For example, the processor 100 can include a Central Processing Unit (CPU) only or, can be a combination of a CPU, a Digital Signal Processor (DSP), a Graphic Processing Unit (GPU), and various control chips. The CPU can be a single operation core or multi-operation core.

The input device 200 can include standard touch screen, keyboard, camera, etc. and can also include cable interface, wireless interface and the like.

The Memory 500 can be used to store software programs and units, the processor 100, the input device 200, and the output device 300 can perform various functions and achieve data processing by invoking software programs and units stored in the Memory 500. The Memory 500 includes a program storage area and a data storage area, among which the program storage area can be configure to store operating systems and application programs required by at least one function; the data storage area can be configured to store data created according to the usage of the playing device. The operating system referred to herein can be an Android system, an iOS system, or a Windows operating system and so on.

As one implementation, the processor 100 is configured to invoke the programs stored in the Memory 500 to perform the following operations.

A Bluetooth connection request sent from a first audio source device is received.

Responding to the Bluetooth connection request, a Bluetooth connection with the first audio source device is established and other playing devices of a target playing group including the first playing device are notified to close Bluetooth function, wherein the target playing group includes at least one playing device communicating via a private network established in advance; and First audio data from the first audio source device is received based on the Bluetooth connection and is forwarded to the other playing devices of the target playing group via the private network, whereby all playing devices of the target playing group will play music corresponding to the first audio data.

As one implementation, the processor 100 is configured to invoke the programs stored in the Memory 500 to perform the following operations.

The Bluetooth connection with the first audio source device is disconnected upon reception of a Bluetooth connection request from a second audio source device and the other playing devices of the target playing group are notified to stop working via the private network; and Second audio data from the second audio source device is received and forwarded to the other playing devices of the target playing group via the private network, whereby all playing devices of the target playing group will play music corresponding to the second audio data.

As one implementation, the processor 100 is configured to invoke the programs stored in the Memory 500 to perform the following operations.

All playing devices of the target playing group are notified via the private network to restart Bluetooth function upon disconnection of the Bluetooth connection with the first audio source device, whereby a third audio source device can choose, from the target playing group, a second playing device that is required to establish a Bluetooth connection;

Bluetooth function is turned off upon reception of a Bluetooth close message from the second playing device; and Third audio data sent from the third audio source device is received and forwarded by the second playing device, and music corresponding to the third audio data is played.

As one implementation, before the processor 100 invoking the programs stored in the Memory 500 to perform the process of notifying the other playing devices of the target playing group including the first playing device to close Bluetooth function, the processor 100 can still invoke the programs stored in the Memory 500 to perform the following operations.

Identity information of the first audio source device is acquired.

Determine whether the identity information acquired matches preset identity information of a legitimate audio source device; and if yes, proceed to the process of notifying the other playing devices of the target playing group including the first playing device to turn off Bluetooth function.

As one implementation, after the processor 100 invoking the programs stored in the Memory 500 to perform the process of establishing the Bluetooth connection with the first audio source device responding to the Bluetooth connection request, the processor 100 can still invoke the programs stored in the Memory 500 to perform the following operations.

The working state of the audio playing apparatus is set to an un-connectable state, under which state the first playing device is prohibited from response to a Bluetooth connection request from an audio source device.

Implementation 9

Figure 8:
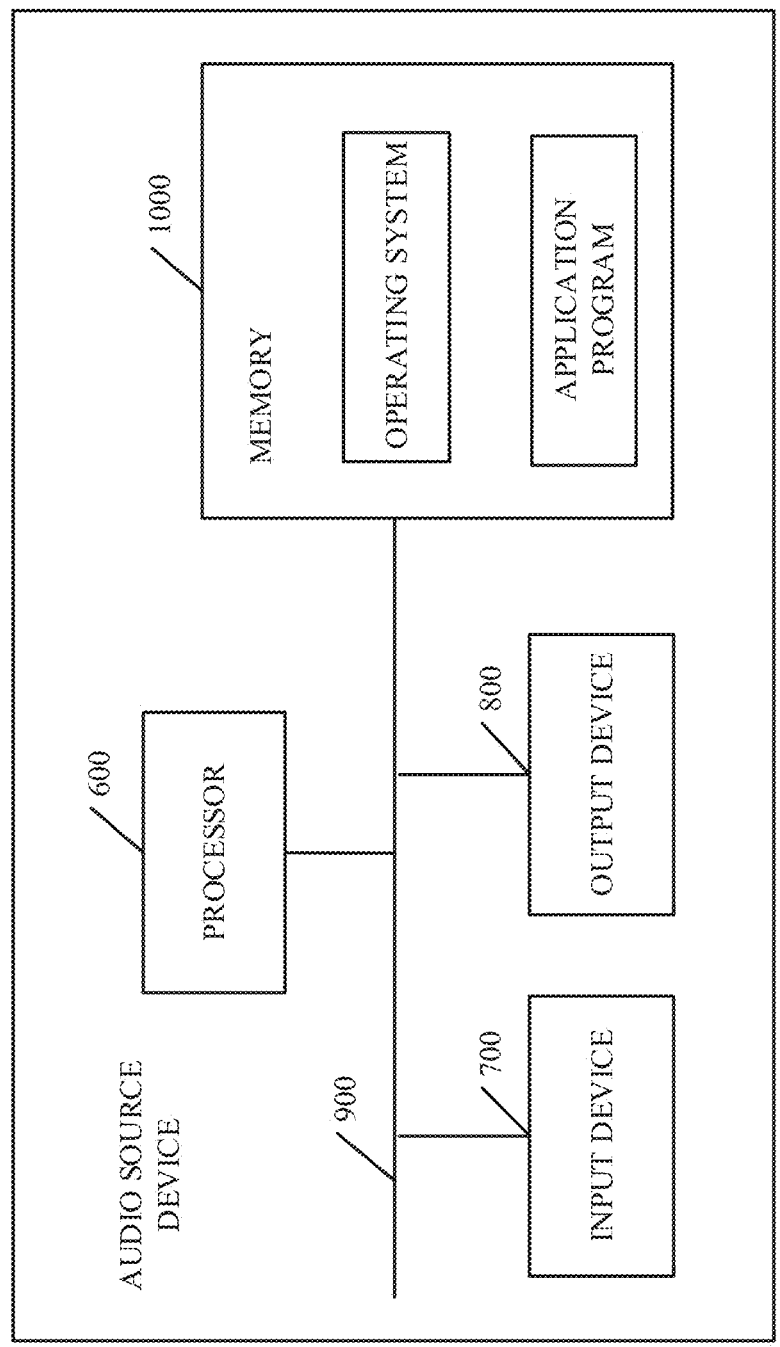
FIG. 8 is a schematic structure diagram illustrating an audio source device according to an implementation of the present disclosure.

FIG. 8 is a schematic structure diagram illustrating an audio source device according to an implementation of the present disclosure. A mobile audio source as shown in FIG. 8 can include a processor 600, at least one input device 700, at least one output device 800, a memory 1000, and other components. Those components can be connected via one or more Buses 900 for communication. The structure of the audio source device illustrated in FIG. 8 should not be comprehend as any limitation to the implementation of the present disclosure, it can be a bus topology structure or a star topology structure; in addition, the structure can include more or less components than those illustrated or use a combination of some of the components or even adopt a different component layout.

The processor 600 is the control center of the playing device, it use various interfaces and circuits to connect each part of the whole playing device, and can perform various functions and process data of the playing device through performing or running programs and/or units stored in the memory 1000 and invoking data stored in the memory 1000. The processor 600 can be composed of an Integrated Circuit (IC), for example, it can be composed by a single packaged IC or by connecting multiple packaged ICs with the same or different function. For example, the processor 100 can include a Central Processing Unit (CPU) only or, can be a combination of a CPU, a Digital Signal Processor (DSP), a Graphic Processing Unit (GPU), and various control chips. The CPU can be a single operation core or multi-operation core.

The input device 700 can include standard touch screen, keyboard, camera, and the like as well as wired interface, wireless interface, and the like.

The output device 800 can include display, speaker, and so on as well as cable interface, wireless interface and the like.

The memory 1000 can be used to store software programs and units, the processor 600, the input device 700, and the output device 800 can perform various functions and achieve data processing by invoking software programs and units stored in the Memory 1000. The Memory 1000 includes a program storage area and a data storage area, among which the program storage area can be configure to store operating systems and application programs required by at least one function; the data storage area can be configured to store data created according to the usage of the playing device. The operating systems referred to herein can be Android system, iOS system, or Windows operating system and so on.

As one implementation, the processor 600 is configured to invoke the programs stored in the Memory 1000 to perform the following operations.

Determine a first playing device from an audio playing system, wherein the first playing device is configured to play music corresponding to first audio data, and the audio playing system includes at least one playing group and each playing group includes at least one playing device communicating via a private network established in advance.

A Bluetooth connection request is sent to the first playing device so as to establish a Bluetooth connection with the first playing device;

The first audio data is sent to the first playing device based on the Bluetooth connection, whereby the first playing device will forward the first audio data to other playing devices of a target playing group that the first playing device belongs to via the private network, and whereby all playing devices of the target playing group will play music corresponding to the first audio data.

As one implementation, the processor 600 is configured to invoke the programs stored in the Memory 1000 to perform the following operations.

A playing group management instruction triggered through a user operation is received.

Responding to the playing group management instruction, playing groups corresponding to the playing group management instruction of the audio playing system are managed, wherein the management includes one or more of changing playing group name, adding playing devices to playing groups, deleting playing devices from playing groups, and deleting playing groups.

In the above mentioned implementations, the description of the various implementations are different in emphases, for contents not described in detail, please refer to related description of other implementations.

Those of ordinary skill in the art will be appreciated that all or part of the steps of the above-described various methods can be completed via program instructed hardware, the program may be stored in a computer readable storage medium which be a flash memory, a Read Only Memory (ROM), a Random Access Memory (RAM), a magnetic disk or CD.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:
1. A method for audio playing based on Bluetooth connection, comprising:
receiving, by a first playing device, a first Bluetooth connection request sent from a first audio source device;

responding to the first Bluetooth connection request by the first playing device, establishing a first Bluetooth connection with the first audio source device, and notifying, by the first playing device, other playing devices of a target playing group to close Bluetooth function, wherein the target playing group comprises the first playing device and at least one playing device communicating via a private network established in advance; and receiving first audio data from the first audio source device by the first playing device based on the first Bluetooth connection, and forwarding the first audio data to the other playing devices of the target playing group via the private network by the first playing device, whereby all playing devices of the target playing group will play music corresponding to the first audio data.

2. The method of claim 1, further comprising:

receiving a second Bluetooth connection request sent from a second audio source device;

disconnecting the first Bluetooth connection with the first audio source device and notifying the other playing devices of the target playing group to stop working via the private network by the first playing device; and establishing a second Bluetooth connection with the second audio source device by the first playing device.

3. The method of claim 2, further comprising:

receiving second audio data from the second audio source device via the second Bluetooth connection by the first playing device; and forwarding the second audio data to the other playing devices of the target playing group via the private network by the first playing device, whereby all playing devices of the target playing group will play music corresponding to the second audio data.

4. The method of claim 1, further comprising:

notifying all playing devices of the target playing group via the private network to restart Bluetooth function upon disconnection of the first Bluetooth connection with the first audio source device by the first playing device, whereby a third audio source device can choose, from the target playing group, a second playing device that is required to establish a third Bluetooth connection; and turning off Bluetooth function by the first playing device upon reception of a Bluetooth close message from the second playing device.

5. The method of claim 4, further comprising:

receiving third audio data sent from the third audio source device and forwarded by the second playing device; and playing music corresponding to the third audio data by the first playing device.

6. The method of claim 1, wherein before notifying the other playing devices of the target playing group to close Bluetooth function, the method further comprising:

acquiring identity information of the first audio source device by the first playing device;

determining whether the identity information acquired matches preset identity information by the first playing device; and when the identity information matches the preset identity information, notifying the other playing devices of the target playing group comprising the first playing device to turn off Bluetooth function by the first playing device.

7. The method of claim 1, wherein after establishing the first Bluetooth connection with the first audio source device, the method further comprising:

setting a working state of the first playing device to an un-connectable state by the first playing device, wherein under the un-connectable state, the first playing device is prohibited from responding to a second Bluetooth connection request sent from a second audio source device.

8. An apparatus for audio playing arranged in a first playing device, comprising:

one or more processors;

a memory configured to store one or more programs, when executed by the one or more processors, the one or more programs are configured to perform the following units:

a receiving unit, configured to receive a first Bluetooth connection request sent from a first audio source device;

a connection controlling unit, configured to establish a first Bluetooth connection with the first audio source device responding to the first Bluetooth connection request;

a notifying unit, configured to notify other playing devices of a target playing group to close Bluetooth function, wherein the target playing group comprises the first playing device and at least one playing device communicating via a private network established in advance; and a transceiver unit, configured to receive first audio data from the first audio source device based on the first Bluetooth connection and forward the first audio data to the other playing devices of the target playing group via the private network, whereby all playing devices of the target playing group will play music corresponding to the first audio data.

9. The apparatus of claim 8, wherein the one or more programs are further configured to:

perform the receiving unit to receive a second Bluetooth connection request sent from a second audio source device;

perform the connection controlling unit to disconnect the first Bluetooth connection with the first audio source device upon reception of the second Bluetooth connection request from the second audio source device by the receiving unit;

perform the connection controlling unit to establish a second Bluetooth connection with the second audio source device; and perform the notifying unit to notify the other playing devices of the target playing group to stop working via the private network.

10. The apparatus of claim 9, wherein the one or more programs are further configured to:

perform the transceiver unit to receive second audio data from the second audio source device via the second Bluetooth connection and forward the second audio data to the other playing devices of the target playing group via the private network, whereby all playing devices of the target playing group will play music corresponding to the second audio data.

11. The apparatus of claim 8, wherein the one or more programs are further configured to:

perform the notifying unit to notify all playing devices of the target playing group via the private network to restart Bluetooth function upon disconnection of the first Bluetooth connection with the first audio source device, whereby from the target playing group, a third audio source device can choose a second playing device required to establish a third Bluetooth connection; and perform the receiving unit to turn off Bluetooth function upon reception of a Bluetooth close message sent form the second playing device.

12. The apparatus of claim 11, wherein the one or more programs are further configured to:

perform the transceiver unit to receive third audio data sent from the third audio source device and forwarded by the second playing device; and play music corresponding to the third audio data.

13. The apparatus of claim 8, the one or more programs are further configured to perform the following units:

an information acquiring unit, configured to acquire identity information of the first audio source device; and an information matching unit, configured to determine whether the identity information acquired by the information acquiring unit matches preset identity information, and trigger the notifying unit to notify the other playing devices of the target playing group comprising the first playing device to turn off Bluetooth function when the identity information matches the preset identity information.

14. The apparatus of claim 8, the one or more programs are further configured to perform the following unit:

a state setting unit, configured to setting a working state of the first playing device to an un-connectable state, wherein under the un-connectable state, the first playing device is prohibited from responding to a second Bluetooth connection request sent from a second audio source device.

* * * * *